(No Model.) 2 Sheets—Sheet 2.

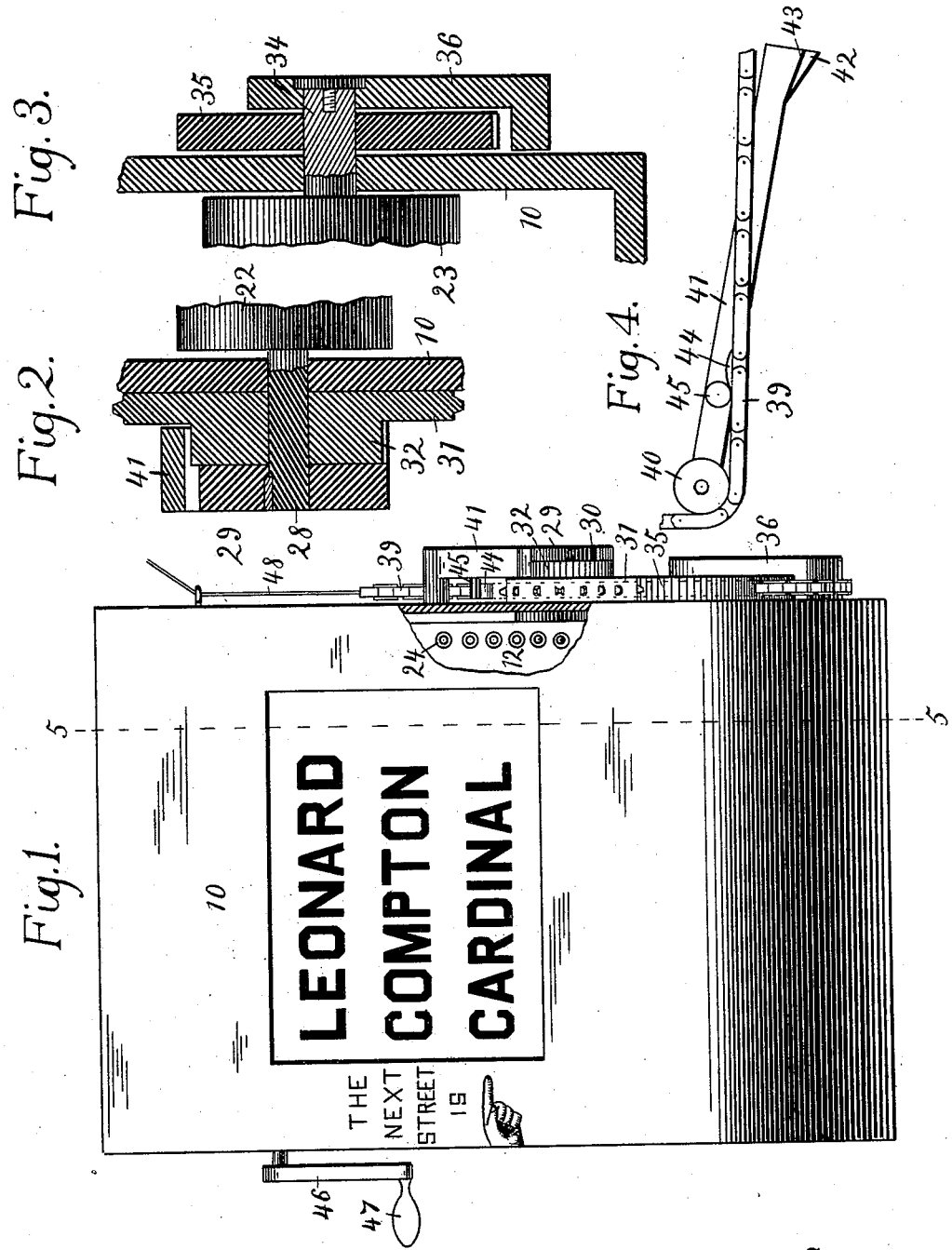

J. H. MORSE.
STATION INDICATOR.

No. 579,802. Patented Mar. 30, 1897.

Witnesses
W. A. Alexander
E. E. Vinall

Inventor
John H. Morse
By Attorneys
Fowler & Fowler

THE NORRIS PETERS CO., PHOTO-LITHO., WASHINGTON, D. C.

UNITED STATES PATENT OFFICE.

JOHN H. MORSE, OF ST. LOUIS, MISSOURI.

STATION-INDICATOR.

SPECIFICATION forming part of Letters Patent No. 579,802, dated March 30, 1897.

Application filed September 3, 1896. Serial No. 604,693. (No model.)

*To all whom it may concern:*

Be it known that I, JOHN H. MORSE, a citizen of the United States, residing at the city of St. Louis, in the State of Missouri, have invented a certain new and useful Street-Indicating Device, of which the following is such a full, clear, and exact description as will enable any one skilled in the art to which it appertains to make and use the same, reference being had to the accompanying drawings, forming part of this specification.

My invention relates to devices for indicating streets or stations on railways, and is particularly adapted for use in connection with street-railways.

The principal object of my invention is to provide means whereby the strip of material upon which the names of the streets or stations are placed may be moved a uniform distance each time it is desired to indicate another street or station.

My invention consists in the various novel features and details of construction described in the following specification and pointed out in the claims affixed hereto.

Figure 5:
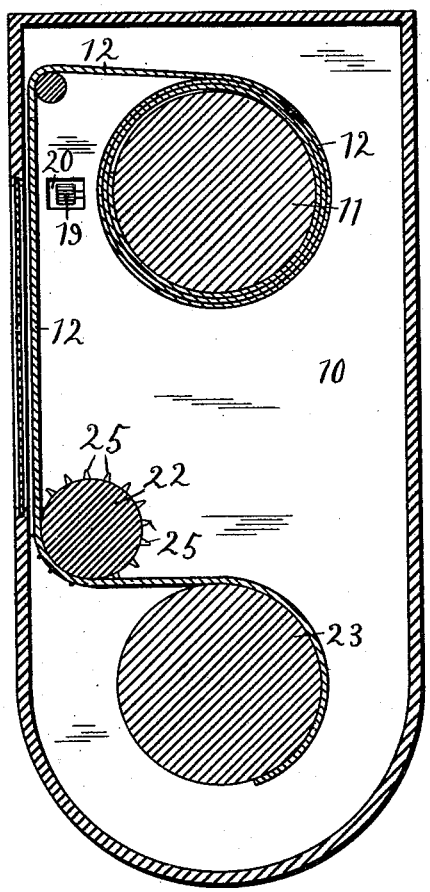
Figure 6:
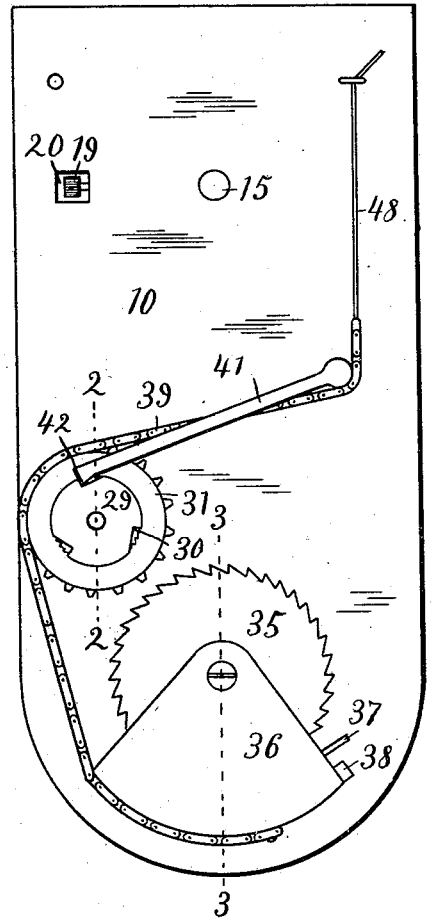
Figure 7:
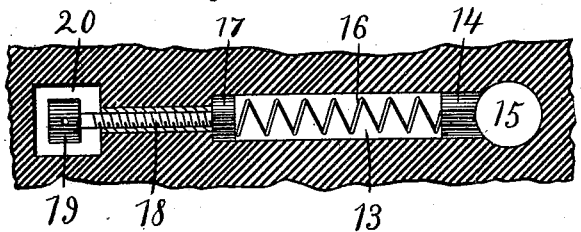
Figure 8:
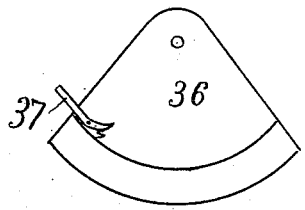

In the accompanying drawings, which illustrate a street-indicating device made in accordance with my invention, Figure 1 is a front elevation, part of the casing being broken away. Fig. 2 is an enlarged section on the line 2 2 of Fig. 6. Fig. 3 is an enlarged section on the line 3 3 of Fig. 6. Fig. 4 is an enlarged detail view. Fig. 5 is a section on the line 5 5 of Fig. 1. Fig. 6 is a side elevation. Fig. 7 is an enlarged view in section showing a detail of construction. Fig. 8 is an elevation of a detail.

Like marks of reference refer to similar parts in the several views of the drawings.

10 is the casing, which may be made of any suitable material. Journaled in the case 10 is a roller 11, around which is wound a band or ribbon of flexible material 12, on which the names of the streets are placed. In each side of the case 10 is a cylindrical opening 13, Fig. 7, in which is a short cylinder 14, which bears against the journal 15 of the roller 11. In the opening 13 is a coil-spring 16, one end of which bears against the cylinder 14 and the other against a disk 17. Bearing against the disk 17 is one end of a screw-threaded rod 18, the opposite end of which is provided with an enlarged portion or head 19, which is situated in an opening 20 in the casing 10. In the head 19 are formed two or more openings. By inserting a suitable instrument in these openings the rod 18 can be rotated and the force with which the cylinder 14 bears against the journal 15 thus regulated. The end of the strip of flexible material 12 after leaving the roller 11 is brought around a guide-roller 21, which holds it close to the front of the casing and a roller 22, and attached to a roller 23. Along the edges of the strip 12 and at equal distances apart are placed eyelets 24, Fig. 1. The roller 22 is provided with teeth or projections 25, Fig. 5, which enter the eyelets 24 and thus cause the said roller to rotate the same distance that the strip 12 travels. In the front of the casing 10 is an opening, preferably glazed, through which the names of the streets can be seen, as shown in Fig. 1. I prefer to make this opening large enough to show the names of three streets, but it may be made so as to only show one.

The journal 28 of the roller 22 extends through the casing 10 and has keyed or otherwise rigidly secured to it a disk 29. At equal distances around the periphery of the disk 29 are formed notches 30, the number of these notches depending upon the diameter of the roller 22 and the distance it is desired to move the strip 12 each time the indicator is actuated. Between the disk 29 and the casing 10 a sprocket-wheel 31 is loosely mounted on the journal 28. A ratchet-wheel 32 is formed integral with the sprocket-wheel 31 or rigidly secured to it. The journal 34, Fig. 3, of the roller 23 is extended through the casing 10, and on it is rigidly secured a ratchet-wheel 35. On the end of the journal 34 is pivoted a part 36, approximately in the form of a sector of a circle. On the part 36 is carried a dog 37, which engages with the ratchet-wheel 35. The end of the dog 37 projects beyond the part 36, so that it can be taken out of engagement with the wheel 35 by pressure on the projecting portion. The motion of the part 36 is limited in one direction by a stop 38, Fig. 6. Secured to the part 36 is one end of a sprocket-chain 39, which passes around the sprocket-wheel 31, and a small wheel or roller 40, Fig. 4, between the casing 10 and a pivoted arm 41. On the arm 41 are two detents 42 and 43, which engage with the notched disk 29 and the ratchet-wheel 32, respectively. On the chain 39 is a projection 44, Fig. 4, which engages with a projection 45 on the arm 41 when the said chain is pulled to actuate the indicator, and thus raises the arm out of engagement with the disk 29 and the wheel 32. The end of the roller 11 is extended through the casing 10, preferably at the side opposite the gearing above described, and to it is secured, by preference, a crank-arm 46, Fig. 1, provided with a suitable handle 47. A suitable cord 48 is secured to the end of the chain 39 and runs along the car, as is usual with fare-indicators, or to any particular spot from which it is desired to operate the indicator.

The operation of my indicator is as follows: When it is desired to actuate the indicator, the cord 48 is pulled. This brings the projection 44 in contact with the projection 45 and raises the arm 41, thus bringing the detents 42 and 43 out of engagement with the disk 29 and wheel 32. When the projection 44 has passed the projection 45, the disk 29 will be rotated sufficiently to allow the detent 42 to rest on its periphery and thus hold the detent 43 out of engagement with the wheel 32. As the chain 39 is drawn up it swings the piece 36 on its pivot, and as the dog 37 engages with the ratchet-wheel 35 the said wheel is rotated. This rotates the roller 23 and winds the strip of flexible material 12 on the same. As the teeth 25 on the roller 22 engage with the eyelets 24 in the strip 12 the said roller is rotated, and thereby the disk 29. As soon as the strip 12 had been moved the required distance the disk 29 comes in position to allow the detent 42 to drop in one of the notches 30. This allows the detent 43 to engage with the wheel 32, thus locking the sprocket-wheel 31, and thereby the chain 39, against further movement. The cord 48 is then slackened and the parts drop back to their normal positions. The pressure of the cylinder 14 against the journals 15 of the roller 11 prevents this roller from rotating further than needful and thus causing slack in the strip 12.

As is readily seen from the above description of the operation of my indicator, the strip 12 is moved exactly the same distance every time the indicator is actuated. If, however, the roller on which the flexible material is wound were rotated a fixed distance each time, as in all indicators of the class previous to my invention, so far as I am aware, the flexible material would be moved gradually farther each time as the diameter of the roller was increased by the material wound on it.

When the end of the strip 12 is reached, the arm 41 is raised, the dog 37 taken out of engagement with the wheel 35 by pressure on the extended portion, and the crank-handle 47 rotated to rewind the strip on the roller 11.

Having fully described my invention, what I claim as new, and desire to secure by Letters Patent of the United States, is—

1. In a street or station indicating device, a strip of flexible material having the names of the streets or stations thereon, rollers upon which said flexible material is carried, a ratchet-wheel rotating with one of said rollers, a pivotally-mounted movable member actuating said ratchet-wheel, a sprocket-chain attached to said movable member, a sprocket-wheel over which said sprocket-chain travels, a locking device for locking said sprocket-wheel against rotation, and a rotary member independent of the rollers by which said strip is carried actuated by the movement of said strip of flexible material and controlling said locking device.

2. In a street or station indicating device, a strip of flexible material having the names of the streets or stations thereon, rollers upon which said strip is carried, a roller independent of the said rollers upon which the said strip is carried and actuated by the movement of said strip, a rotary member rigidly carried by said latter-named roller, a locking device controlled by said rotary member, a second rotary member loosely carried by said latter-named roller and controlled by said locking device, and means for simultaneously actuating said latter-named rotary member and one of the rollers upon which said strip of flexible material is carried.

3. In a street or station indicating device, a strip of flexible material having the names of the streets or stations thereon, rollers upon which said strip is carried, a roller independent of the rollers upon which said strip is carried and actuated by the movement of said strip, a rotary member rigidly carried by said latter-named roller, a locking device governed by said rotary member, a sprocket-wheel loosely carried by said latter-named roller and governed by said locking device, and a sprocket-chain engaging with said sprocket-wheel and actuating one of the rollers upon which said strip of flexible material is carried.

In testimony whereof I have hereunto set my hand and affixed my seal in the presence of the two subscribing witnesses.

JOHN H. MORSE. [L. S.]

Witnesses:
A. C. FOWLER,
E. E. VEMELL.